United States Patent [19]
Eyer et al.

[11] Patent Number: 5,962,046
[45] Date of Patent: Oct. 5, 1999

[54] CONTINUOUS FERMENTATION PROCESS

[75] Inventors: Kurt Eyer, Thun; Jürg Aebischer, Liebefeld, both of Switzerland; Fred Neumann, Steffisburg, Germany; Johann Illi, Th-Pattaya, Thailand

[73] Assignee: Nestec S.A., Vevey, Switzerland

[21] Appl. No.: 08/993,361

[22] Filed: Dec. 18, 1997

[30] Foreign Application Priority Data

Dec. 24, 1996 [EP] European Pat. Off. .............. 96203706

[51] Int. Cl.$^6$ ................................................... A23C 9/12
[52] U.S. Cl. .............................. 426/34; 426/42; 426/43; 426/61; 426/44
[58] Field of Search ................................. 426/43, 34, 42, 426/39, 61, 49, 52, 44; 99/452, 455

[56] References Cited

U.S. PATENT DOCUMENTS 3,924,007  12/1975  Driessen et al. ........................... 426/43

FOREIGN PATENT DOCUMENTS 472 501  10/1971  Australia .

OTHER PUBLICATIONS

Tamime et al. *Yoghurt: Science and Technology*, 1985, Pergamon Press, pp. 137–139, 236, 267–271.
Process Biochemistry, vol. 11, No. 5, 1976, pp. 39–40, XPoo2031925, H. Lelieveld, "Continous fermentation in yoghurt manufacture".
Biotechnology and Bioengineering, vol. XIX, 1977, pp. 841–851, XP002031925, F. Driessen "Continuous manufacture of yoghurt".
Deutsche Milchwirtschaft, vol. 29, 1980, pp. 1199–1202, XP000646537, L. Van Der Loo, "Kontinuierliche Zubereitung von Ruhrjoghurt in industriellem Ausmass".

*Primary Examiner*—Keith D. Hendricks
*Attorney, Agent, or Firm*—Pennie & Edmonds LLP

[57] ABSTRACT

Process for the continuous preparation of a fermented milk in which (1) a milk fermented by lactic acid bacteria is prepared in a first device, the fermented milk being subjected to stirring and pH conditions such that syneresis of the milk does not occur, the pH being regulated by the continuous addition of unfermented milk to the first device and continuously drawing off fermented milk from the first device; (2) in a second, post-acidification device, the fermented milk drawn off from the first device is cooled to a temperature of less than 15° C. so as to subject the fermented milk to a post-acidification, the residence time of the fermented milk in the second device being adjusted so that at the outlet of the latter, the pH of the fermented milk is less than pH 4.7; and (3) a fermented milk having a pH of less than pH 4.7 is continuously drawn off from the second device.

15 Claims, 2 Drawing Sheets

CONTINUOUS FERMENTATION PROCESS

TECHNICAL FIELD

The subject of the present invention is a continuous process for the preparation of a fermented milk by a lactic acid bacterium.

BACKGROUND

The continuous fermentation of a milk by lactic acid bacteria requires stirring of the milk so that unfermented milk can be added to and fermented milk drawn off from the fermentation tank. When the pH of such a stirred milk reaches a pH of 4.8–5.2, the milk casein micelles tend to agglomerate and to become concentrated until they become irreversibly coagulated. This coagulation phenomenon, called "syneresis", unfortunately destroys the consistency of the fermented milk (Veisseyre, Technologie du Lait, Ed. La Maison Rustique, Paris, 1975, I.S.B.N. 2-7066-0018-7, pages 427–438).

To overcome this disadvantage, a fermented milk may be prepared in a semicontinuous manner, by first preparing continuously a preculture of lactic acid bacteria having a pH greater than 5 so as to avoid the appearance of a complete syneresis, then secondly by inoculating a milk with this preculture and by subjecting it to batch fermentation without stirring up to a pH of about 4.5.

The continuous preparation of a preculture of lactic acid bacteria, as well as the use of this preculture in the context of the semicontinuous manufacture of a fermented milk is well known. By way of examples, there may be mentioned the processes described by Dries sen et al., (Biotechnology and Bioengineering, 29, 821–839, 1977), by Lelieved et al., (Bioengineering, 11, 39–40, 1976), by Lelieved (Process Biochemistry, 19, 112–113, 1984), by MacBean et al., (Biotechnology and Bioengineering, 21, 1517–1531, 1979), by Prevost et al., (Milchwissenschaft, 43, 622–719, 1988), by Reichart (Acta Alimentaria, 8, 373–381, 1979), by Schuler (DE2006894) and by Spreer et al., (Lebensmittel-biotechnologie, 7, 28–31, 1991).

During a continuous process for the preparation of a fermented milk, it is also possible to partially prevent the complete formation of a syneresis.

To this effect, U.S. Pat. No. 3,924,007 describes a continuous process in which, a preculture of lactic acid bacteria having a pH greater than 5 is first continuously prepared so as to avoid syneresis of the milk, and then secondly, this preculture is continuously fermented while it is being stirred in a manner such that a stirring gradient becomes established in the fermented milk, avoiding the appearance of a complete syneresis of the milk.

Such a stirring gradient has also been used by Van der Loo in the context of the continuous preparation of a fermented milk (Deutsche Milchwirtschaft, 29, 1199–1202, 1980). In this process, milk and a preculture of lactic acid bacteria are added at the top of a fermentation tank at pH 5.7, the fermented milk is subjected, in the tank, to a stirring gradient, and the fermented milk is drawn off from the bottom of the tank.

Unfortunately, these continuous processes for the preparation of a fermented milk are not completely satisfactory. Indeed, milk derived from a continuous fermentation never have a pH of less than 4.7, for fear of reinforcing syneresis of the milk. In some cases, these fermented milks are also subjected to shear forces such that the consistency of the milk becomes profoundly modified as a result.

The present invention aims to overcome the disadvantages of the prior art by providing a process which can be easily conducted.

SUMMARY OF THE INVENTION

The invention relates to a process for the continuous preparation of a fermented milk in which:

a milk fermented by lactic acid bacteria is prepared in a first device, the fermented milk being subjected to stirring and pH conditions such that syneresis of the milk does not occur, with the pH being regulated by the continuous addition of unfermented milk to the first device and continuously drawing off fermented milk from the first device;

in a second, post-acidification device, the fermented milk drawn off from the first device is cooled to a temperature of less than 15° C. so as to subject the fermented milk to a post-acidification, the residence time of the fermented milk in the second device being adjusted so that at the outlet of the latter, the pH of the fermented milk is less than pH 4.7; and a fermented milk having a pH of less than 4.7 is continuously drawn off from the second device.

DETAILED DESCRIPTION OF THE INVENTION

Milk is intended to designate, on the one hand, a milk of animal origin, such as milk from a cow, goat, sheep, buffalo, zebra, horse, ass, camel, and the like. This milk may be a milk in the native state, a reconstituted milk, a skimmed milk, or a milk supplemented with compounds necessary for the growth of the bacteria or for the subsequent treatment of the fermented milk, such as fat, yeast extract, peptone and/or a surfactant.

The term milk also applies to what is commonly called a vegetable milk, that is to say an extract of plant materials, treated or otherwise, such as legumes (soyabean, chickpea, lentil and the like) or oilseeds (rapeseed, soyabean, sesame, cotton and the like), which extract contains proteins in solution or in colloidal suspension, coagulable by chemical action, by acid fermentation and/or by heat. It has been possible to subject these vegetable milks to heat treatments similar to those for animal milks. It has also been possible to subject them to treatments which are specific to them, such as decolorization, deodorization, and treatments for eliminating undesirable tastes. Finally, the word milk also designates mixtures of animal milks and of vegetable milks.

This milk should be pasteurized, that is to say should have been subjected to a heat treatment and/or to a high-pressure treatment which has inactivated all living microorganisms. These techniques are well known to persons skilled in the art.

This milk can be fermented by at least one strain of lactic acid bacterium, in particular by bifidobacteria such as *Bifidobacterium infantis,* lactococci such as *Lactococcus lactis* subsp. *lactis, Lactococcus lactis* subsp. *cremoris, Lactococcus lactis* subsp. *lactic biovar diacetylactis,* streptococci such as *Streptococcus thermophilus, Streptococcus faecalis,* lactobacilli such as *Lactobacillus delbrueckii* subsp. *bulgaricus, Lactobacillus acidophilus, Lactobacillus johnsonii, Lactobacillus gasseri, Lactobacillus amylovorus, Lactobacillus helveticus, Lactobacillus farciminis, Lactobacillus alimentarius, Lactobacillus casei* subsp. *casei, Lactobacillus delbruckii* subsp. *lactis, Lactobacillus sake, Lactobacillus curvatus,* pediococci such as *Pediococcus*

*pentosaceus, Pediococcus acidilactici, Pediococcus halophilus,* staphylococci such as *Staphylococcus xylosus, Staphylococcus carnosus,* micrococci such as *Micrococcus varians,* for example.

The invention is particularly appropriate for microorganisms which are sensitive to the culture conditions, in particular those which are sensitive to the presence of air. Among the microorganisms which are particularly sensitive, there may be mentioned the probiotic lactic acid bacteria, such as the *Lactobacillus acidophilus* CNCM I-1225 strain described in EP577904 (reclassified *L. johnsonii*), that is to say the lactic acid bacteria which are capable of adhering to human intestinal cells, of excluding pathogenic bacteria from human intestinal cells, and of increasing the property of the human body to defend itself against pathogens, for example by increasing the phagocytosis capacities of the granulocytes derived from human blood (J. of Dairy Science, 78, 491–197, 1995: immunomodulation capacity of the La-1 strain which has been deposited at the Pasteur Institute under the number CNCM I-1225).

The word "continuous" is understood to mean the continual production of a fermented milk, it being possible to control the various flows of materials involved in the process according to the invention by valves which also operate as pumps, the valves being connected to probes and to computing machines regulating the opening of the valves, it being possible for the opening of the valves to also be temporarily closed.

To carry out the present invention, in a first stage, a first milk fermented by lactic acid bacteria is continuously prepared at a temperature appropriate for the growth of the chosen bacterial species, the said fermented milk being subjected to stirring and pH conditions such that syneresis of the milk does not occur, and the said pH being regulated at a level defined by the continuous addition of pasteurized milk and the continuous drawing off of fermented milk. These operations can be carried out in any device appropriate for the stirred culture of lactic acid bacteria, but in particular in a heated tank which includes a system for mixing the fermented medium, and having at least one inlet for the pasteurized (unfermented) milk and one outlet for the fermented milk, the pH being regulated by the continuous addition of pasteurized milk and continuous drawing off of fermented milk by means of probes analysing the pH and the volume, and of valves at the inlet and at the outlet of the tank, it being possible for the opening of the valves to be controlled by a computing machine connected to the probes, for example. It is within the capability of persons skilled in the art to develop such a device. This device can very well be adapted from those described by Driessen et al. (Biotechnology and bioengineering, 29, 821–1977), by Lelieved et al. (Bioengineering, 11, 39–40, 1976), by Lelieved (Process Biochemistry, 19, 112–113, 1984), by MacBean et al. (Biotechnology and Bioengineering, 21, 1517–1531, 1979), by Prevost et al. (Milchwissenschaft, 43, 622–719, 1988), by Reichart (Acta Alimentaria, 8, 373–381, 1979), by Schuler (DE2006894), and by Spreer et al. (Lebensmittel-biotechnologie, 7, 28–31, 1991), for example.

In particular, if a milk is fermented by probiotic lactic acid bacteria, provision can be made for this milk to be fermented continuously under a neutral gas atmosphere, such as carbon dioxide or nitrogen, for example.

Preferably, the fermented milk continuously drawn off from the first device comprises at least $10^6$ cfu/g of lactic acid bacteria (cfu means Colony Forming Unit), particularly $10^7$–$10^9$ cfu/g.

This fermented milk may also exhibit an onset of formation of a syneresis which should preferably be barely perceptible in the mouth of a taster. When the pH of the fermented milk is of the order of 5.2, the casein micelles are sufficiently unstable to begin to agglomerate. Between pH 4.9 and 5.2, the agglomerated micelles become concentrated without, however, precipitating, which can then give a slight sensation of granulosity in the mouth of a taster. The pH at which the sensation of granulosity of a milk becomes too perceptible depends on the composition of the milk and on the heat treatment to which it has been subjected. In general, as the pH approaches and drops below 4.9, the risk of making the milk unfit for consumption increases.

To regulate the pH of the fermented milk and to suitably renew the bacteria population which is sensitive to phage attacks (see to this effect EP 748871), a pasteurized (unfermented) milk and lactic acid bacteria can be continuously added to the first device, and the fermented milk can be continuously drawn off from the first device, for example. These lactic acid bacteria can be added in the form of a prefermented milk which may have a pH of less than 5 and/or which may have at least $10^7$ cfu/g, in particular $10^8$–$10^{10}$ cfu/g, for example. These lactic acid bacteria can also be added in the form of a culture dried by freeze-drying or by spray-drying in a stream of hot air (see to this effect EP 96201922.0), or in the form of a frozen culture which was, where appropriate, concentrated before freezing (see to this effect EP 688864).

To carry out the present invention, in a second stage, the fermented milk continuously drawn off from the first device is cooled in a second device to a temperature of less than 15° C., preferably 2–10° C., so as to subject this fermented milk to a post-acidification, the residence time of this milk in the second device being adjusted so that at the outlet of the latter, the pH of the fermented milk is less than pH 4.7.

This second device may be at least one refrigerated tube, the fermented milk progressing continuously in this tube by means of appropriate pumps, for example at a throughput of less than 400 l/h, the milk then being subjected to a post-acidification to a pH which may be less than 4.7 at the outlet of the tube. Preferably, this specific embodiment is applied for fermented milks which, at the outlet of the first device, have a pH of the order of 4.9–5.1, and/or a temperature close to 15° C., such as 13–20° C.

To accelerate this post-acidification, it is also possible to regulate the pH of the fermented milk continuously obtained from the first device, by continuously adding an acidic composition having a temperature of less than 15° C. and a pH of less than 4.9, but preferably a temperature of the order of 1–10° C. and a pH of the order of 2.5–4.7, for example.

The second device may thus be a refrigerated tank continuously stirring a fermented milk, the fermented milk drawn off from the first device being continuously introduced into this tank, an acidic composition also being continuously introduced into this tank so as to accelerate the post-acidification, a fermented milk having a pH of less than 4.7 being finally continuously drawn off from this tank.

The acidic composition may be, moreover, a milk fermented by lactic acid bacteria but which is not coagulated. For that, a milk simply has to be fermented beforehand by lactic acid bacteria to a pH of less than 4.9, for example a pH of 3.9–4.7, without mechanical agitation so as to avoid syneresis of the milk, and then to continuously remove part of this fermented milk, to cool it and to add it to the fermented milk at the inlet of the second device, for example.

The acidic composition may also be a concentrated solution of at least one food acid, such as lactic acid, citric acid and/or malonic acid, for example. These food acids are preferably used to accelerate the post-acidification of the plant material-based milks described above.

BRIEF DESCRIPTION OF THE DRAWINGS

The present invention will be understood more clearly with reference to FIGS. 1 and 2 which schematically represent devices appropriate for carrying out the present invention.

DETAILED DESCRIPTION OF THE DRAWINGS

Figure 1:
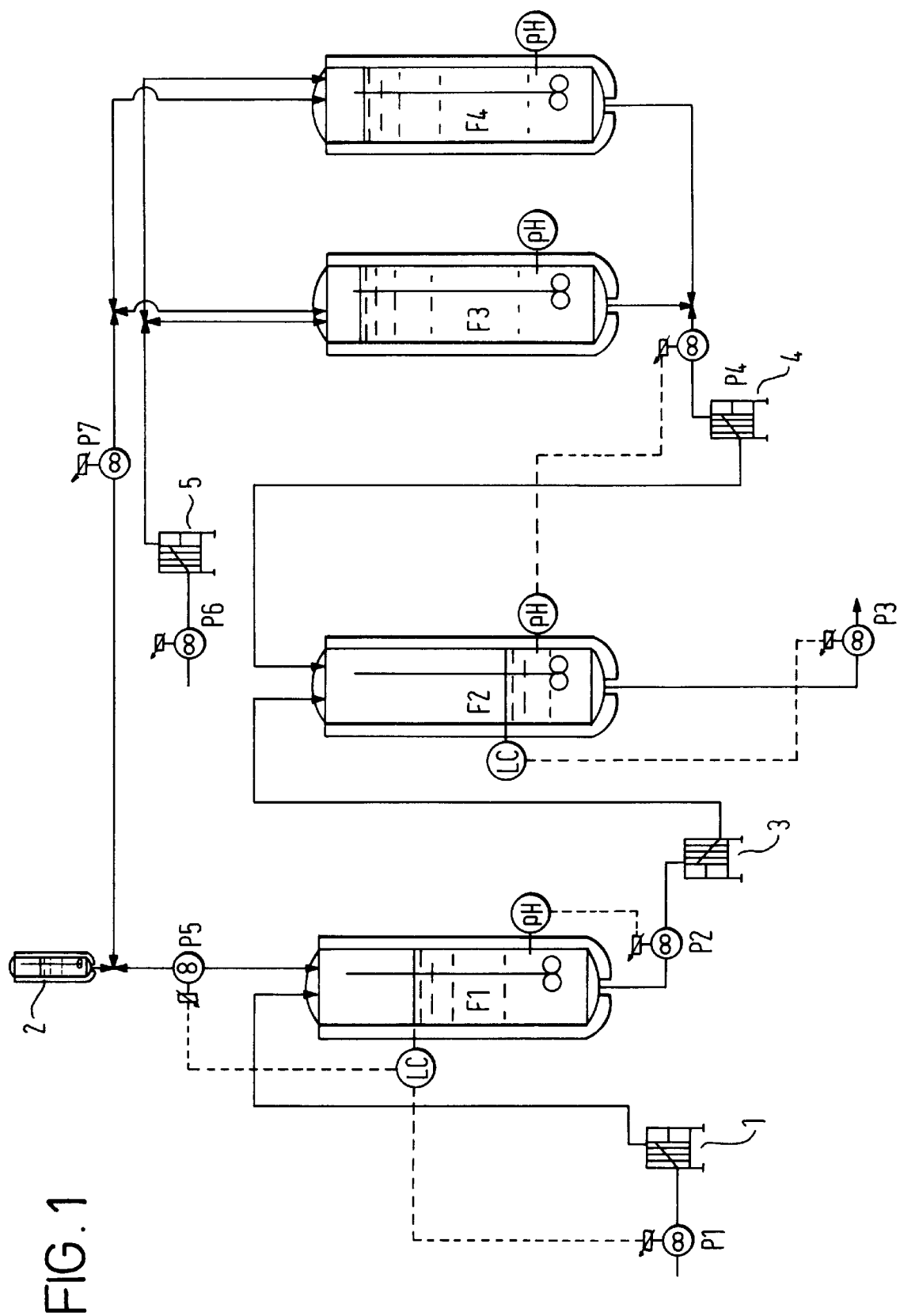

FIG. 1 presents 4 jacketed fermenters F1 to F4, each fermenter having a pH probe, the fermenters F1 and F2 having, in addition, a volume level probe "LC" and the pH and volume probes of the fermenters F1 and F2 controlling the opening of the valves P1 to P5, as indicated by the dotted lines. When these devices operate continuously, pasteurized milk is heated by means of the radiator 1 to the optimum temperature for the growth of the bacteria. This heated milk is then introduced into the fermenter F1 which contains a fermented milk having a pH greater than the pH at which a perceptible syneresis is initiated. A small quantity of starter culture of lactic acid bacteria 2 may also be introduced into the fermenter F1. Fermented milk is drawn off from the fermenter F1, it is cooled to a refrigeration temperature by means of a refrigerator 3, and it is introduced into the refrigerated fermenter F2. To regulate the pH of the fermented milk contained in the fermenter F2, a second acidic fermented milk cooled by means of the refrigerator 4 is introduced into the fermenter F2 in parallel. This second milk is obtained from one of the two fermenters F3 and F4 operating alternately. Indeed, for each fermenter F3 and F4, operating alternately, they are filled with milk heated by means of the heater 5, the milk is inoculated by means of the starter culture 2, the milk is incubated without agitation at a temperature favourable to bacterial growth to a pH of less than 4.9, the culture is stirred and it is drawn off so as to be introduced into the fermenter F2. When one of the two fermenters F3 and F4 is drawn off, the other is filled and then incubated. Finally, a fermented milk having a pH of less than or equal to 4.7 and not having a texture linked to the appearance of syneresis of the milk is continuously drawn off from the fermenter F3.

Figure 2:
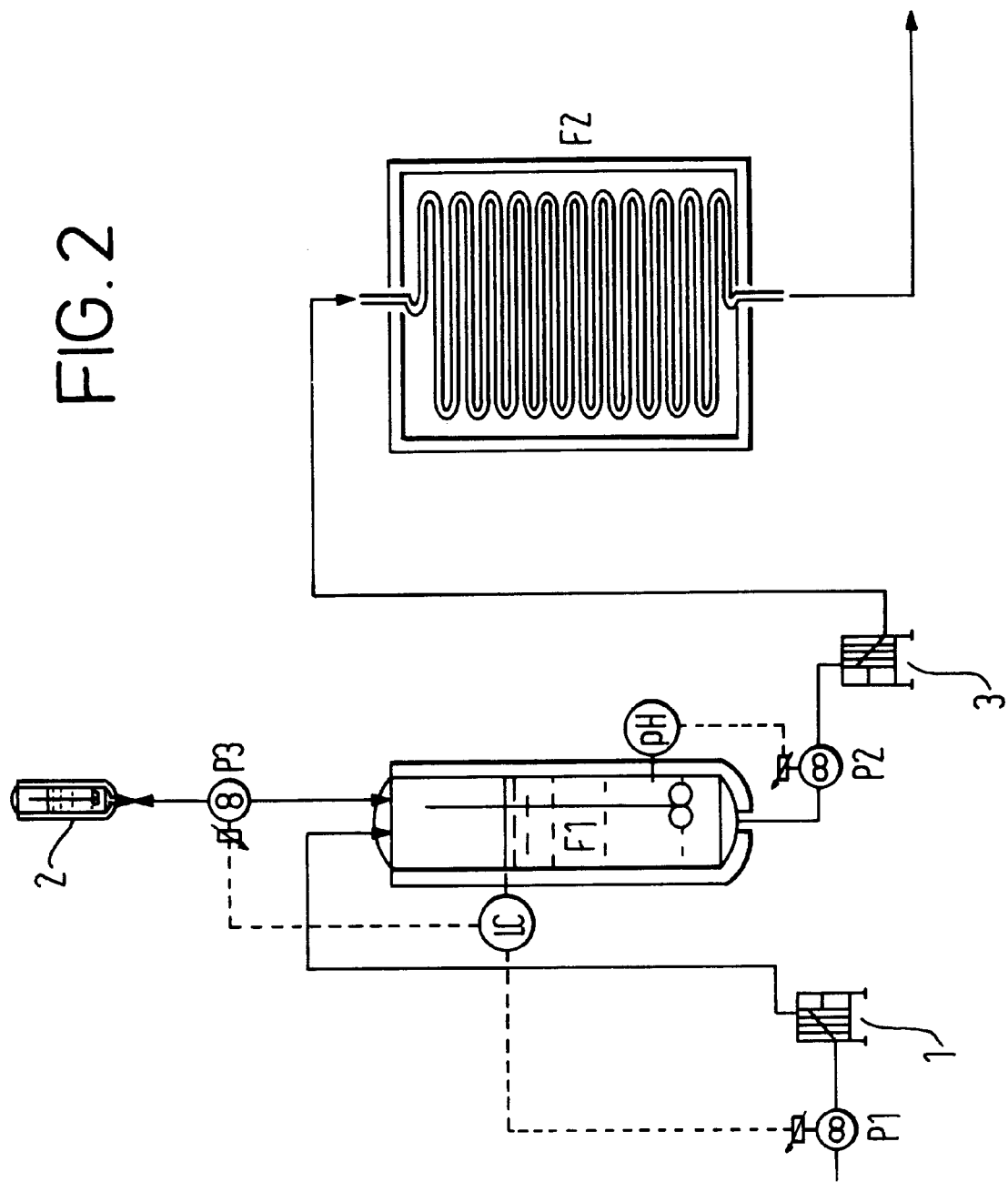

FIG. 2 presents a jacketed fermenter F1 comprising a volume probe "LC" and a pH probe, these two probes controlling the opening of the valves P1, P2 and P3, as indicated by a dotted line. The device F2 consists of a refrigerated chamber through which runs a long tube. When these devices operate continuously, pasteurized milk is heated by means of the radiator 1 to an optimum temperature for the growth of the bacteria. This heated milk is then introduced into the fermenter F1 which contains a fermented milk having a pH just above the pH at which a perceptible syneresis is initiated. A small quantity of starter culture of lactic acid bacteria 2 may also be introduced into the fermenter F1. Fermented milk is drawn off from the fermenter F1, it is cooled to a refrigeration temperature by means of a refrigerator 3, and it is introduced into the tube at the inlet of the device F2. The invention is not limited to the presence of a single tube in the device F2. Persons skilled in the art are capable of choosing the number of tubes necessary to divide the main stream of fermented milk into several small streams, the diameter of the tubes, their length, the throughput of the principal stream and the refrigeration temperature being chosen so that the fermented milk can be further post-acidified to a pH of less than or equal to 4.7. Finally, a fermented milk having a pH of less than or equal to pH 4.7 and not having a texture linked to the appearance of syneresis of the milk is continuously drawn off from the device F2.

EXAMPLES

The present invention is described in greater detail below with the aid of the additional description which follows, which refers to examples of continuous preparation of fermented milks. The percentages and the parts are given by weight unless otherwise stated. It goes without saying, however, that these examples are given by way of illustration of the subject of the invention and do not constitute in any manner a limitation thereto.

Example 1

A yoghurt is produced continuously with the aid of the devices described in FIG. 1, and with the aid of the strains *Streptococcus thermophilus* CNCM I-1292 and *Lactobacillus bulgaricus* CNCM I-1348, deposited respectively, on Aug. 5, 1993 and on Mar. 29, 1993, at the Pasteur Institute, 25 rue du docteur Roux, 75724 Paris.

For that, a starter culture of these strains is first prepared by inoculating a pasteurized skimmed milk, supplemented with 0.1% yeast extract, with 3% of a fresh preculture of each strain taken at the end of the exponential growth phase, incubating the mixture at 43° C. to pH 4.3 (about 3.5 hours), and then cooling it to 10° C.

In parallel, a milk is prepared comprising 14% dry matter and 2.2% fat, it is pasteurized at 105° C. for 2 min, it is cooled to 70° C., it is homogenized at 300 bar and it is cooled to 4° C.

To prepare the continuous production of yoghurt, the fermenter F3 is filled with 2000 l of this milk, it is inoculated with 3% of the starter culture, it is incubated without stirring at 43° C. to pH 4–4.2. Next, the fermenter F1 is filled with 80 l of pasteurized milk, it is inoculated with 3% of the starter culture, and the milk is incubated at 43° C., stirring it until a pH of 5.7 is reached. In parallel, the 80 l fermenter F2, refrigerated to 2° C., is half filled with the fermented milk obtained from the fermenter F3.

The continuous production of yoghurt is started under the following conditions: the pH in the fermenter F1 is regulated to 5.7 by means of the controlled action of the valves P1, P2 and P5 (continuous addition of starter); the first fermented milk drawn off from the fermenter F1 is cooled to 2° C. with the aid of a refrigerator; the pH in the fermenter F2, refrigerated to 2° C., is regulated to pH 4.5 by the controlled addition of fermented milk, refrigerated to 2° C., obtained from the fermenter F3. While milk is being drawn off from the fermenter F3, the fermenter F4 is filled with pasteurized milk, it is inoculated and it is incubated until the milk reaches a pH of 4–4.2 (as for the fermenter F3). When the fermenter F3 is emptied, the fermented milk is then drawn off from the fermenter F4, and a culture is again started in the fermenter F3 (the fermenters F3 and F4 used alternately). The given streams of materials on passing each of the valves P1 to P7 are in general the following; P1+P5=P2; P3=P1+P4+P5; P5=3% of P1; and P7=3% of P6, for example.

Finally, a yoghurt having a pH of 4.5 is continuously drawn off from the fermenter F2 at a throughput of the order of 450 l/h.

Example 2

In the same manner as in Example 1, a milk is prepared which is acidified with the aid of the probiotic strain

*Lactobacillus johnsonii* CNCM I-1225 described in EP 577904 and of the strain *Streptococcus thermophilus* CNCM I-1421, these two strains having been respectively deposited, on Jun. 30, 1992 and May 18, 1994, at the Pasteur Institute, 25 rue du docteur Roux, 75724 Paris, France. Unlike Example 1, a carbon dioxide atmosphere is introduced into the fermenters F1 and F2.

The acidified milk thus continuously obtained has a texture identical to that of the "plain" commercial acidified milk LC1® (Hirtz®, Switzerland), which is a fermented milk prepared in a traditional manner with the CNCM I-1225 strain and a *Streptococcus thermophilus* strain.

Example 3

A yoghurt is produced continuously with the aid of the devices described in FIG. 2, and with the aid of the *Streptococcus thermophilus* CNCM I-1292 and *Lactobacillus bulgaricus* CNCM I-1348 strains deposited respectively on Aug. 5, 1993 and Mar. 29, 1993 at the Pasteur Institute, 25 rue du docteur Roux, 75724 Paris.

For that, a starter culture of these strains is first prepared by inoculating a pasteurized skimmed milk, supplemented with 0.1% yeast extract, with 3% of a fresh preculture of each strain taken at the end of the exponential growth phase, incubating the mixture at 43° C. to pH 4.3 (about 3.5 hours), and then cooling it to 10° C.

In parallel, a milk comprising 14% dry matter and 2.2% fat is prepared, it is pasteurized at 15° C. for 2 min, it is cooled to 70° C., it is homogenized at 300 bar and it is cooled to 4° C.

To prepare the continuous production of yoghurt, the fermenter F1 is filled with 80 l of pasteurized milk, it is inoculated with 3% of the starter culture, and the milk is incubated at 43° C., stirring it until a pH of 4.9 is obtained. Then, the continuous production of yoghurt is started under the following conditions: the pH in the fermenter F1 is regulated to 4.9 by means of the controlled action of the valves P1, P2 and P3 (continuous addition of starter); the fermented milk drawn off from the fermenter F1 is cooled to 14° C. with the aid of a refrigerator; the device F2 is cooled to 15° C.; the length, diameter and throughput in the tube (less than 400 l/h) in the device F2 are such that the pH of the fermented milk at the outlet of the device F2 is of the order of pH 4.7; the calculated streams of materials on passing each of the valves P1 to P3 are in general the following: P1+P3=P2 and P5=3% of P1.

Finally, an acidified milk having a pH of the order of 4.7 is continuously drawn off from the fermenter F2, the fermented milk having barely a small granulosity in the mouth.

Example 4

A soyamilk acidified by the probiotic strain *Lactobacillus johnsonii* CNCM I-1225 is continuously prepared with the aid of a device similar to that described in FIG. 1.

For that, a milk is prepared comprising, in water, 2.9% soyabean flour and 14.6% sucrose. The continuous production of fermented soyamilk is initiated as described in Example 1, under the following conditions: the pH in the fermenter F1 is regulated to 5 by means of the controlled action of the valves P1 and P2; the first fermented milk drawn off from the fermenter F1 is cooled to 4° C. with the aid of a refrigerator; and the pH in the fermenter F2, refrigerated to 4° C., is regulated to pH 3.75 by the controlled addition of a 10% solution of lactic acid contained in the tank F3 (no tank F4).

We claim:

1. A process for the continuous preparation of a fermented milk product which comprises:
   fermenting a milk with lactic acid bacteria;
   introducing the fermented milk into a first device;
   subjecting the fermented milk to stirring and pH conditions such that syneresis of the milk does not occur, with the pH being maintained within a range of between about 4.9 to about 5.7 by continuously adding unfermented milk to the first device while continuously drawing off fermented milk from the first device;
   introducing the drawn-off fermented milk into a second, post-acidification device;
   cooling the drawn-off fermented milk to a temperature of less than 15° C.;
   adding an acidic composition having a pH of less than about 4.9 to the fermented milk, with the residence time of the fermented milk and acidic composition in the second device being adjusted so that the pH of the fermented milk is reduced to 4.7; and
   continuously drawing off fermented milk having a pH of less than 4.7 from the second device as the fermented milk product.

2. The process of claim 1, which further comprises continuously adding lactic acid bacteria to the first device.

3. The process of claim 2, wherein the lactic acid bacteria are added in the form of a prefermented milk having a pH of less than 5.

4. The process of claim 1, which further comprises regulating the pH of the fermented milk in the second device by continuous addition of an acidic composition having a pH of less than 4.9 and a temperature of less than 15° C.

5. The process of claim 4, wherein the acidic composition is a non-coagulated fermented milk or an organic acid.

6. The process of claim 1 wherein the organic acid is a solution of lactic acid, citric acid or malonic acid.

7. The process of claim 1, wherein the fermented milk is prepared using probiotic lactic acid bacteria.

8. The process according to claim 2, wherein the lactic acid bacteria is at least one strain of bifidobacteria, lactococci, streptococci, lactobacilli, pediococci, staphylococci, or micrococci.

9. The process according to claim 8, wherein the lactic acid bacteria is at least one strain of *Bifidobacterium infantis, Lactococcus lactis* subsp. *lactis, Lactococcus lactis* subsp. *cremoris, Lactococcus lactis* subsp. *lactic biovar diacetylactis, Streptococci thermophilus, Streptococci faecalis, Lactobacillus delbrueckii* subsp. *bulgaricus, Lactobacillus acidophilus, Lactobacillus johsonii, Lactobacillus gasseri, Lactobacillus amylovorus, Lactobacillus helveticus, Lactobacillus farciminis, Lactobacillus alimentarius, Lactobacillus casei* subsp. *casei, Lactobacillus delbruckii* subsp. *lactis, Lactobacillus sake, Lactobacillus curvatus, Pediococcus pentosaceus, Pediococcus acidilactici, Pediococcus halophilus, Staphylococcus xylosus, Staphylococcus carnosus,* or *Micrococcus varians*.

10. The process according to claim 1, wherein the acidic composition has a temperature of less than about 15° C. when added to the fermented milk to cool the fermented milk to the recited temperature of less than 15° C.

11. The process according to claim 10, wherein the acidic composition has a temperature of between about 1° C. and about 15° C.

12. The process of claim 1, wherein the acidic composition has a pH range of between about 2.5 and about 4.7.

13. The process according to claim 1, wherein the process is carried out under a neutral gas atmosphere.

14. The process according to claim 13, wherein the neutral gas is nitrogen, carbon dioxide, or a mixture thereof.

15. The process according to claim 1, wherein the second device is in the shape of a tube.

* * * * *

UNITED STATES PATENT AND TRADEMARK OFFICE
CERTIFICATE OF CORRECTION

PATENT NO.   :   5,962,046

DATED        :   October 5, 1999

INVENTOR(S)  :   Kurt Eyer et al.

It is certified that error appears in the above-identified patent and that said Letters Patent is hereby corrected as shown below:

In column 8, line 64 (claim 11, line 3): change "15°C." to --10°C--.

Signed and Sealed this

Twenty-fifth Day of April, 2000

Attest:

Q. TODD DICKINSON

Attesting Officer                    Director of Patents and Trademarks